US012582101B1

(12) United States Patent
Wang et al.

(10) Patent No.: US 12,582,101 B1
(45) Date of Patent: Mar. 24, 2026

(54) ESTUARINE FISHERIES HABITAT RESTORATION THREE-DIMENSIONAL DEVICE AND ASSESSMENT METHOD

(71) Applicant: East China Sea Fisheries Research Institute, Chinese Academy of Fishery Sciences, Shanghai (CN)

(72) Inventors: Sikai Wang, Shanghai (CN); Feng Zhao, Shanghai (CN); Tingting Zhang, Shanghai (CN); Chao Song, Shanghai (CN); Gang Yang, Shanghai (CN); Guangpeng Feng, Shanghai (CN); Junlin Ren, Shanghai (CN)

(*) Notice: Subject to any disclaimer, the term of this patent is extended or adjusted under 35 U.S.C. 154(b) by 0 days.

(21) Appl. No.: 19/022,200

(22) Filed: Jan. 15, 2025

Related U.S. Application Data

(63) Continuation of application No. PCT/CN2025/071527, filed on Jan. 9, 2025.

(30) Foreign Application Priority Data

Dec. 26, 2024 (CN) .......................... 202411936703.5

(51) Int. Cl.

| | |
|---|---|
| *A01K 61/75* | (2017.01) |
| *A01G 9/00* | (2018.01) |
| *A01K 61/73* | (2017.01) |
| *G01N 1/04* | (2006.01) |
| *G01N 1/10* | (2006.01) |

(52) U.S. Cl.
CPC ................ *A01K 61/75* (2017.01); *A01G 9/00* (2013.01); *A01K 61/73* (2017.01); *G01N 1/04* (2013.01); *G01N 1/10* (2013.01); *G01N 2001/1006* (2013.01); *G01N 2001/1031* (2013.01)

(58) Field of Classification Search
CPC ................................ A01K 61/73; A01K 61/75
See application file for complete search history.

(56) References Cited

U.S. PATENT DOCUMENTS

2005/0183331 A1* 8/2005 Kania .................... A01K 61/70
47/65.5

FOREIGN PATENT DOCUMENTS

| | | | | |
|---|---|---|---|---|
| CN | 104129856 A | 11/2014 | | |
| CN | 108178322 A | 6/2018 | | |
| CN | 207726820 U | 8/2018 | | |
| CN | 108496865 A | * 9/2018 | ............. | A01K 61/75 |
| CN | 110589981 A | 12/2019 | | |
| CN | 210808820 U | * 6/2020 | | |
| CN | 114642187 A | 6/2022 | | |
| CN | 115281120 A | 11/2022 | | |
| CN | 118633559 A | 9/2024 | | |
| JP | H1056893 A | * 3/1998 | | |

(Continued)

OTHER PUBLICATIONS

Li Yun-tao et al., The enhancement effects of fishery resources on artificial fish nest: A review Freshwater Fisheries, No. 4, May 16, 2018, pp. 60-64.

*Primary Examiner* — Magdalena Topolski

(57) ABSTRACT

An estuarine fisheries habitat restoration three-dimensional device includes a plant floating bed region, a pipe reef region, a gabion mesh box region and a stainless steel frame structure. The estuarine fisheries can provide diversified habitats for different kinds of aquatic organisms by constructing a three-dimensional restoration device including the plant floating bed region, the pipe reef region, and the gabion mesh box region.

2 Claims, 3 Drawing Sheets

(56)     References Cited

FOREIGN PATENT DOCUMENTS

| JP | 2011212527 A | 10/2011 |
| KR | 20110031859 A | 3/2011 |

* cited by examiner a first assessment is started one month after an installation of a restoration device is completed, and a subsequent assessment interval is determined based on a seasonal change and a biological growth cycle, and the sampling is performed when biologically active in the spring, vigorous growth in the summer, post-breeding in the fall, and before dormancy in the winter to provide a comprehensive picture of their seasonal impacts on the fishery environment S1 sampling time determination the region of the restoration device and the nearby mudflat are divided into several sub-regions, which are accurately divided based on topographic and geomorphic features using geographic information system (GIS) technology to ensure the representativeness and comparability of the environmental conditions, and each sub-region contains a part of the plant floating bed region, the pipe reef region, and the gabion mesh box region S2 sampling region division gabion mesh box sampling uses random stratification method, from different specifications of the mesh box of the upper and lower layers of the collection of benthic fauna and attached organisms, pipe reef sampling gently flushes collected organisms in an inlet, middle, outlet of the randomly selected PVC pipe, plant floating bed sampling uses first non-destructive measurements of the growth indexes, and then equidistant sampling of destructive collection of plant modules, and stratification of the collection of control sub-region of the sediment samples after screening to obtain the aquatic organisms S3 sampling method the samples are brought back to the laboratory, the above ground part and root part of the plant floating bed samples are separated from to measure the dry weight, wet weight and analyze the chemical composition to detect nutrient plants and heavy metal content, other aquatic organisms samples are classified and screened, to remove impurities, and then combines with morphology and molecular biology to identify the species, and the size and weight of individuals are measured with precision instruments for biological parameters S4 sample processing and analysis establishing a database to enter and manage collection and analysis data to calculate species richness (number of species), number of organisms (total number of individuals of species), density of organisms (based on area and number), and Shannon-Weiner index (based on the proportion of individuals of species), and managing the data and assessing the restoration of estuarine fisheries environments by comparing the differences in these indicators between restoration regions and control regions.

Figure 5:
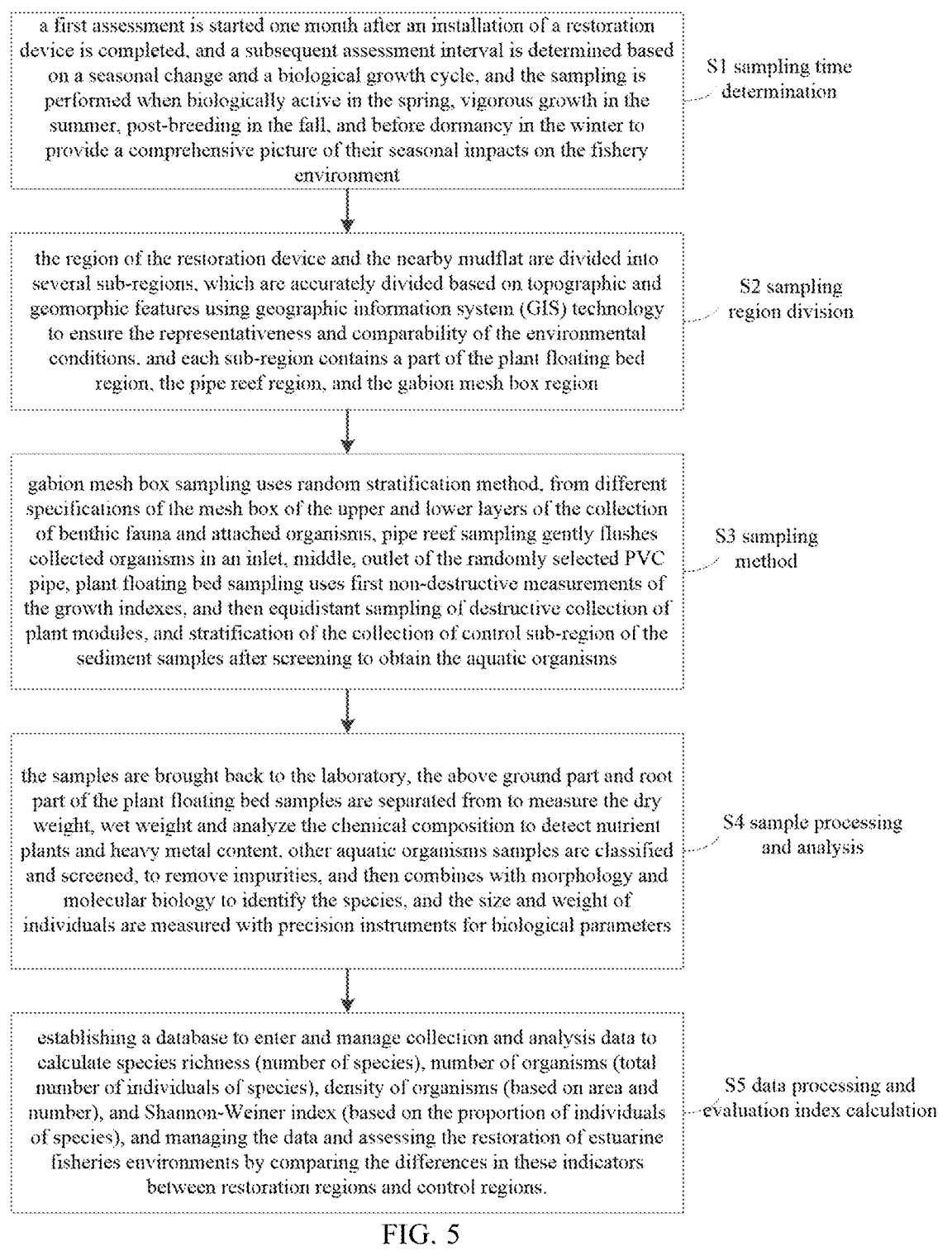

S5 data processing and evaluation index calculation

ESTUARINE FISHERIES HABITAT RESTORATION THREE-DIMENSIONAL DEVICE AND ASSESSMENT METHOD

CROSS-REFERENCE TO RELATED APPLICATIONS

The present application claims priority to Chinese Patent Application No. 2024119367035, filed on Dec. 26, 2024, the entire disclosure of which is incorporated herein by reference.

TECHNICAL FIELD

The present application relates to the technical field of fisheries ecological restoration, specifically to estuarine fisheries habitat restoration three-dimensional device and assessment method.

BACKGROUND

Estuarine fisheries habitat is an important part of the ecosystem, which not only provides habitat for many aquatic organisms, but also maintains the ecological balance and human fisheries activities. However, with increase of human activities, the ecological environment in estuaries is seriously damaged, and fisheries habitats are gradually degraded, which leads to a decline in biodiversity and a decrease in fisheries resources, in order to cope with this problem, fisheries ecological restoration technology has emerged, aiming to restore and improve estuarine fisheries habitats through scientific methods.

Although traditional three-dimensional restoration devices can improve fisheries habitats to a certain extent, they still have some obvious shortcomings, and they lack comprehensive consideration of the habitat needs of different types of aquatic organisms. Although gabion meshes can provide habitat for shrimps, crabs, and benthic organisms, they lack flexibility and adaptability, especially in silt-type estuaries, the mesh boxes are easily silted up by silt and cannot provide habitat, and the dynamics changes of biological communities cannot be satisfied.

In summary, traditional fisheries ecological restoration techniques have certain limitations in estuarine fisheries habitat restoration, and in order to overcome these shortcomings, the present application proposes an estuarine fisheries habitat restoration three-dimensional device and an assessment method, which is particularly important.

SUMMARY

The purpose of the present application is to make up for the deficiencies of the related art by providing an estuarine fisheries habitat restoration three-dimensional device and assessment method, which can provide diversified habitats for different kinds of aquatic organisms by constructing a three-dimensional restoration device including a plant floating bed region, a pipe reef region, and a gabion mesh box region, and accurately assessing restoration effects by a systematic assessment method in order to realize estuarine fisheries habitat comprehensive restoration and improvement of the estuarine fisheries habitat.

In order to solve the above technical problems, the present application provides the following technical solutions: an estuarine fisheries habitat restoration three-dimensional device includes a plant floating bed region, a pipe reef region, a gabion mesh box region and a stainless steel frame structure;

the plant floating bed region includes: a foam float, an angle iron, a screw hole in the angle iron for fixing a floating bed, a plant root system, and a polyethylene mesh;

the pipe reef region comprises: a stainless steel frame, a PVC pipe, a first nylon rope, a hole opened in the polyvinyl chloride (PVC) pipe;

the gabion mesh box region comprises: a stainless steel frame, a lead wire cage, a stone block;

the plant floating bed region is located in an upper part of the stainless steel frame, and is composed of the foam float, the stainless steel tube frame and a floating bed plant module, the upper part of the stainless steel frame is welded into nine squares through the angle iron, and the floating bed plant module is placed in each square, the floating bed plant module is screwed to the stainless steel frame through the screw hole in the angle iron;

the floating bed plant module is composed of two layers of polyethylene meshes on a top and a bottom and the plant root system filled in a middle, and is fastened through a plastic ties;

an entire floating bed frame is nested in the stainless steel frame and is located in an uppermost part of the stainless steel frame, and is connected to the stainless steel frame through the nylon rope;

the foam float on a surrounding makes the floating bed with the tidal up and down and does not break away from the stainless steel frame, plant growth purifies the water, a surface of the floating bed provides a resting place for birds, and the plant root system provides an attachment substrate for fish eggs and young fish;

a filling ratio of the plant root system in the floating bed plant module is determined by a formula:

$$P = \frac{V_r}{V_m} \times 100\%$$

where P is the filling ratio of the plant root system, $V_r$ is a total volume of the plant root system, and $V_m$ is a total volume of the floating bed plant module, and the total volume of the plant root system is determined by a product of multiplying an average volume of a single plant root system with an average volume of the plant root system in the floating bed plant module, and the total volume of the floating bed plant module is calculated based on a size of the floating bed plant module;

the pipe reef region is located in a middle of the stainless steel frame and above the gabion mesh box region, 5 different pipe diameter specifications of the PVC pipes are placed on the upper part of the stainless steel frame in the 16 squares, and fixed to the stainless steel frame through the nylon rope;

the pipe reef region provides hiding and sheltering places for fish aquatic organisms, attached organisms is attached in a wall of the PVC pipe, and a distribution density of holes on the PVC pipe is calculated based on a formula:

$$D = \frac{n}{\pi r L};$$

where D is the distribution density of hole, n is a number of holes on a single PVC pipe, r is a radius of the PVC pipe, L is a length of the PVC pipe, and the number of holes on the single PVC pipe is set according to ecological function requirements of the PVC pipes with different pipe diameter specifications;

wherein the gabion mesh box region is provided at a very bottom of the stainless steel frame, with a lead wire cage to make an independent gabion mesh, each gabion mesh is filled with different specifications of stone blocks, each specification is filled with 4 gabion meshes, 16 gabion meshes are randomly placed into a lower part of the stainless steel frame of 16 small squares, a removable cross-bar is provided around the stainless steel frame, the gabion mesh box provides shrimp and crabs and various types of benthic organisms for suitable habitat, different specifications of the stone blocks are filled and layout in the gabion mesh box using layered random filling algorithm, the specific steps are as follows: first, dividing the gabion mesh box into a number of equal volume of small cells, for each specification of the stone block, randomly selecting the small cells for filling, a filling ratio of different specifications of the stone blocks in $$R_i = \frac{N_i}{N_t} \times 100\%,$$

where $R_i$ is a filling ratio of ith specification stone blocks, $N_i$ is a number of the ith specification stone blocks, $N_t$ is a total number of stone blocks in the gabion mesh box, the number of stone blocks is determined according to a volume of the gabion mesh box, specifications of the stone blocks, and a demand for biological habitat;

the stainless steel frame structure is formed by welding stainless steel as a fixed device, a bottom of the stainless steel frame structure is welded with a steel plate as a base, to prevent falling into the sediment deposit, steel pipes are welded in at horizontal and vertical intervals in height of 0.25 m and 0.75 m to form 16 small squares, a surrounding of the entire stainless steel frame structure is connected to an anchor through the nylon rope, the device is fixed in an estuarine intertidal waters, a welding process of the stainless steel frame structure uses a staggered welding method, firstly, a horizontal steel pipe and a vertical steel pipe are spot-welded and fixed at each intersection, then starting from one corner of the stainless steel frame structure to be welded successively based on a specific order, and every time a section of the stainless steel frame structure is welded, an intersection is skipped, and then welding is continued, and a determination of a welding order is derived from an analysis of the force of the stainless steel frame structure under the impact of the water current and the action of wind and waves.

In one embodiment, a selection of the plant root system in the floating bed plant module is based on water quality conditions and biological attachment needs of the estuarine intertidal region, includes:

performing an ecological function analysis of common aquatic plant systems in an estuarine intertidal region, comprising an ability to absorb nitrogen and phosphorus nutrients in a water body and a stability of providing attachment for fish egglets;

establishing an ecological function evaluation model for the plant root system, and evaluation indexes comprise a surface area of the plant root system, a density of root hairs, and a composition of secretion, and analyzing a field sampling and a laboratory analysis of a variety of plant root systems;

obtaining data of each evaluation index, determining a weight of each evaluation index by using hierarchical analysis, calculating a comprehensive ecological function value of each plant root system based on an evaluation model, and selecting a combination of plant root systems with a higher comprehensive ecological function value to be used in the floating bed plant module, wherein a combination mode is matched based on characteristics of different plant root systems.

In one embodiment, the method of selecting material and determining the diameter specification of the PVC pipe is:

performing corrosion resistance, strength and biocompatibility tests on pipes of different materials, placing samples of pipes of different materials in a simulated environment of an estuarine intertidal region;

regularly detecting changes in physical properties of the pipes, and observing attachment and growth of organisms on surfaces of the pipes, and after a long period of time for testing and comparing, discovering that the PVC material is relatively well-balanced in terms of corrosion resistance, strength and biocompatibility, and is suitable for use as the material for the pipe reef;

for a determination of diameter specifications of the pipes, through a study of a body size distribution of fishes and other aquatic organisms in the estuary, a cluster analysis method is used to divide body sizes of the organisms into different categories, and the number of PVC pipes with different diameter specifications is determined based on a proportion of the number of organisms in each category and the demand for space for activities of the organisms in each category.

In one embodiment, a weaving structure and a mesh size of the lead wire cage in the gabion mesh box are designed as follows:

the lead wire cage adopts a double-twisted hexagonal braided structure, which has a higher stability and strength, and during a braiding process, a stranding angle of a lead wire is accurately calculated, and the stranding angle $\alpha$ is determined according to a formula:

$$\alpha = \arctan\left(\frac{d}{h}\right),$$

wherein d is a diameter of the lead wire, and h is a vertical distance between neighboring lead wires, and the stranding angle is optimized by adjusting the diameter of the lead wire and the vertical distance, and the mesh size is designed based on a body size of target benthic organisms, and a dynamic adaptive mesh size algorithm is adopted;

the body size data of common benthic organisms in the estuary are statistically analyzed to obtain a distribution range of the organisms, and based on a distribution of the body sizes of the organisms, the mesh sizes are divided into several grades, and each grade corresponds to a certain range of the organisms;

starting to install the device, a larger mesh size is used and is gradually adjusted according to the development of the biological community, to make the mesh size always be adapted to the growth and habitat needs of the organisms.

In one embodiment, the stainless steel frame structure is connected to the anchor in a following manner:

adopting adjustable length nylon rope to connect the stainless steel frame structure and the anchor, one end of the nylon rope is fixed at a specific position of the stainless steel frame structure by a special buckle structure, the buckle structure ensures that the nylon rope doesn't fall off when subjected to tensile force and is easy to be installed and dismantled, another end of the nylon rope is connected to the anchor, and a shape and a weight of the anchor is designed according to substrate conditions of the estuarine intertidal region; and for a silty substrate, a flat anchor is used, which has a larger area and provides a larger ground force;

for a sandy substrate, a claw anchor is used, whose claw penetrates deep into a sand layer and enhance a fixing effect of the anchor, and a length of the nylon rope is adjustable to in a range of 3 m to 5 m;

an adjustable mechanism is based on a tidal water level and an impact force of the water flow are monitored in real time; and after the device is installed, the tidal water level and water current impact force are monitored by a sensor mounted on the frame, and a length of the nylon rope is automatically adjusted according to the monitoring data, to make the device remain stable under different water level and water current conditions.

In one embodiment, a method of adjusting a buoyancy of the foam float of the plant floating bed is that the foam float is internally divided into a plurality of independent gas chambers using a partitioned structure, and each gas chamber is equipped with a valve that can adjust the air pressure, through which the valve controls the inflow and outflow of gas within the gas chamber, thereby adjusting the buoyancy of the foam float, and the buoyancy is adjusted based on a calculation of the balance between an overall weight of the device and a buoyancy of the tidal water, and measuring a total weight $W_t$ of the plant floating bed, the pipe reef, the gabion mesh box, and the attached living organisms;

a required buoyancy $F_b=\rho\ gV_i$ is calculated based on a density p of the tidal water and a submerged volume $V_i$ of the device in the tidal water, wherein g is an acceleration of gravity, and by adjusting an air pressure inside the air chamber of the foam float, the buoyancy provided by the foam float is equal to or slightly greater than the required buoyancy, to ensure that the plant floating bed is able to float up and down smoothly with the tidal water, and is not detached from the frame due to an excessive buoyancy in the extreme weather conditions.

In one embodiment, a fixed angle and a height of the PVC pipe in the pipe reef on the frame are set that:

the fixed angle of the PVC pipe on the frame is optimized based on a direction of the water flow in the estuary and light conditions, and through long-term monitoring of the direction of the water flow in the estuary, to obtain a main flow direction and a change rule of a speed of the water flow, the PVC pipe is fixed to the frame, so that it is at an angle θ to the direction of the water flow, and a range of θ is 30°-60°, and such angle is set to enable the water flow to produce turbulence when passing through the PVC pipe, increasing an oxygen content in the water, and it is easy for the organisms to enter and exit a pipe silo; and for a light condition, according to a change of sunshine time and an altitude angle of the sun in the estuary region, adjusting the height of the PVC pipe, to make the PVC pipe obtain suitable light in different seasons and time, to promote the growth of the organisms attached on walls of the pipes, and a height adjustment is realized by setting a movable fixing device on the frame, the height of the PVC pipe is precisely adjusted according to the actual demand.

In one embodiment, a surface treatment method of the stone blocks in the gabion mesh box is that a surface of the stone block is treated with a biophilic coating, the coating material is made of a mixture of natural biological material and organic binder, the natural biological material comprises shell powder and coral powder, which are rich in calcium and magnesium;

a preparation process of coating comprises mixing the natural biological material and the organic binder evenly according to a certain ratio, and the coating is uniformly covered on the stone block using a spraying or soaking method surface, a thickness of the coating is determined $$T = \frac{m}{\rho_c S},$$

by a formula:

where T is the thickness of the coating, m is a mass of the coating per unit area, $\rho_c$ is a density of the coating material, and S is a surface area of the stone block.

In another embodiment, there is provided an estuarine fisheries habitat restoration three-dimensional device, including:

S1, sampling time determination: a first assessment is started one month after an installation of a restoration device is completed, and a subsequent assessment interval is determined based on a seasonal change rule of an estuarine ecosystem and a biological growth cycle, respectively, and the sampling is arranged in a spring, summer, fall, and winter, so that the sampling time arrangement comprehensively reflects an effect of the restoration device on impacts of various types of aquatic organisms in the estuary in different seasons;

S2, sampling region division: a region where the restoration device is located is divided into a number of sub-regions, each of which comprises a part of a plant floating bed region, a pipe reef region and a gabion mesh box region, while a control sub-region is divided in a nearby mudflat in accordance with same regions and shapes, and the division of the sub-regions is made by using geographic information system (GIS) technology, which is accurately divided based on topography and geomorphological features of the device and the mudflat, to ensure that each sub-region is representative and that the sub-regions in the restoration region and control regions are comparable in terms of environmental conditions;

S3, sampling method:

sampling of gabion mesh boxes: from the gabion mesh boxes in each sub-region, a certain proportion of mesh boxes is selected for sampling according to a random stratified sampling method, for the mesh boxes with different sizes of stone blocks, the samples are collected in, respectively, an upper, middle, and lower layers, and benthic fauna, and barnacles, oysters and all aquatic organisms attached to the stone blocks are collected into sample bottles, and a sampling tool is used in a sampling process, which is capable of deep into different locations inside the mesh boxes to avoid damage to the organisms and to ensure the comprehensiveness of the samples collected;

sampling of a pipe reef: in each sub-region of the pipe reef, a number of groups of PVC pipes are randomly selected for sampling, for each group of PVC pipes, biological samples are collected from an inlet, a middle, and an outlet, and organisms from all PVC pipes are collected into sample bottles, and a gentle flushing method is used to flush the organisms out of the pipes while avoiding flushing away small organisms or damaging biological tissue;

sampling of a plant floating bed: in each sub-region of the plant floating bed, first measuring height, density, and growth indicators of plants on a ground, using non-destructive measurement methods, and then selecting a certain number of plant floating bed modules for destructive sampling according to an equidistant sampling method from plant floating bed modules, a whole collection is installed into a sorting box, and adopting a stratified sampling method to collect from a surface, middle and deep layers of sediment samples of 50 cm*50 cm*50 cm collected in the control sub-region during a control sampling in a surface, middle and deep layers of sediment are collected respectively, and collecting aquatic organisms samples after flushing through a screen of 0.5 mm;

S4, sample processing and analysis: bringing all collected samples back to a laboratory, separating a part of plant floating bed samples on the ground and a root part of plant floating bed samples, and measuring dry and wet weights using a high-precision balance, while analyzing chemical composition of plant tissues for detecting nutrient content and heavy metal content indexes, classifying and screening other aquatic organisms samples to remove impurities, and using a combination of morphological identification and molecular biology identification for species identification, and using precision measuring instruments to measure sizes, weights and biological parameters of the identified organisms;

S5, data processing and evaluation index calculation: establishing a specialized database, entering and managing the data collected and analyzed, and calculating various evaluation indexes, including a biological species richness S, a biological number N, a biological density $D_b$, a shannon-weiner index H, wherein the biological species richness is derived from the number of species identified through statistics, the biological number is a sum of a number of individuals of each species, and the biological density is derived from an area of a sampling region and a number of organisms, and the shannon-weiner index is $$H = -\sum_{i=1}^{S} p_i \ln p_i,$$

$P_i$ is a ratio of a number of individuals of an ith species to a total number of individuals, and a restoration effect of the restoration device on estuarine fisheries habitats is evaluated by comparing differences between the restoration region and the control region in terms of these indicators.

Compared with the related art, the estuarine fisheries habitat restoration three-dimensional device and the assessment method have the following beneficial effects:

I. The present application provides diversified habitats for different kinds of aquatic organisms by constructing a three-dimensional restoration device including a plant floating bed region, a pipe reef region and a gabion mesh box region. The plant floating bed region not only purifies the water, but also provides a resting place for birds, and its root system provides an attachment substrate for the fish spawn, while the pipe reef region provides a hiding and sheltering place for fishes and other aquatic organisms, and the attached organisms, such as oysters and barnacles, can grow on the walls of the pipes, the gabion mesh box region provides a suitable habitat for shrimp and crabs and all kinds of benthic organisms, this three-dimensional habitat restoration device helps to enhance the ecological diversity of the estuarine fisheries habitat for all kinds of aquatic organisms to provide a better habitat conditions, so as to maintain the ecological balance.

Second, the present application can comprehensively and accurately assess the restoration effect of the restoration device on the estuarine fisheries habitat through scientifically and reasonably determining the sampling time, dividing the sampling region, the sampling method, and the steps of sample processing and analyzing, and can quantitatively assess the effect of the restoration device by comparing the biosample abundance, biomass, biotic density, and the biological diversity index between the restoration region and the control region, and the method can also continuously optimize and improve the restoration device according to the assessment results to further enhance its ecological restoration effect, and this precise assessment and continuous optimization mechanism can help promote the scientific and standardized process of estuarine fisheries habitat restoration work.

Other advantages, objects and features of the present application will to some extent be set forth in the ensuing specification, and to some extent will be apparent to those skilled in the art based on an examination of the following, or can be taught from the practice of the present application.

BRIEF DESCRIPTION OF THE DRAWINGS

In order to more clearly illustrate the technical solutions in the embodiments or related art of the present application, the accompanying drawings to be used in the description of the embodiments or related art will be briefly described below. Obviously, the accompanying drawings in the following description are only some of the embodiments of the present application, and other accompanying drawings can be obtained based on these drawings for those skilled in the art without creative labor.

FIG. 5 is an operational diagram of the process of the assessment method for estuaries fisheries habitat restoration.

DETAILED DESCRIPTION OF THE EMBODIMENTS

In order to further elaborate the technical means and effects adopted by the present application for realizing the intended purpose of the present application, the following specific embodiments, structures, features and their effects according to the present application are described in detail as follows, taking into account the accompanying drawings and preferred embodiments.

Figure 1:
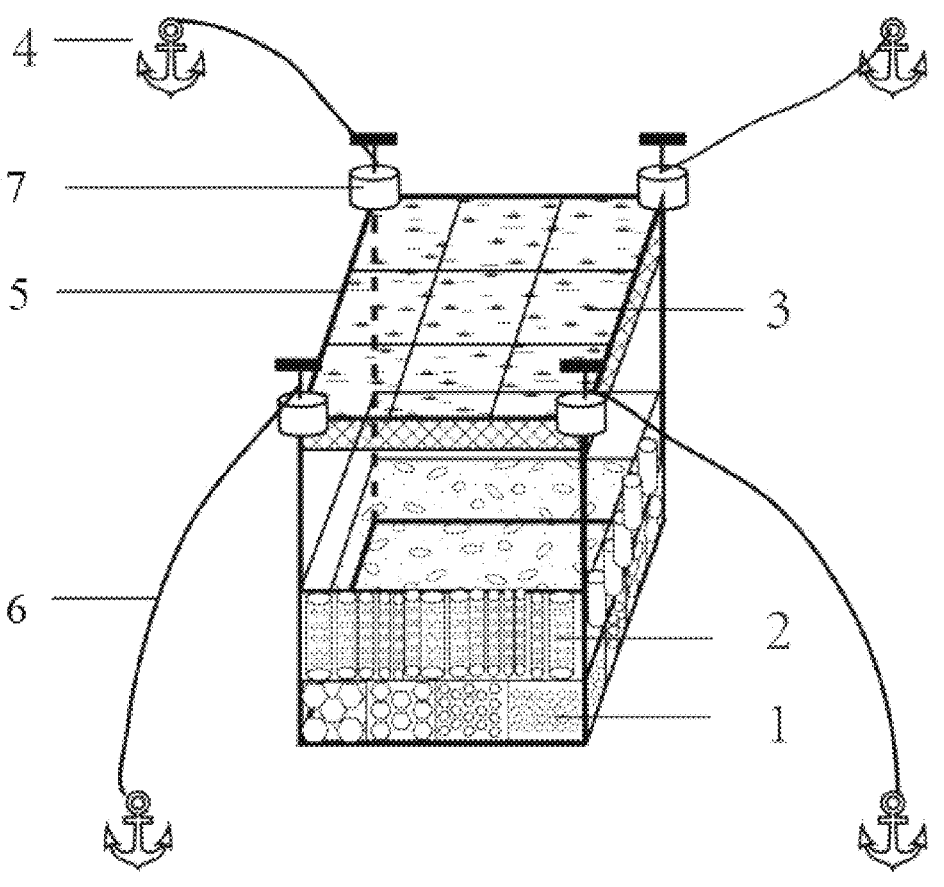
FIG. 1 is a schematic diagram of a fisheries habitat restoration three-dimensional device.
Figure 2:
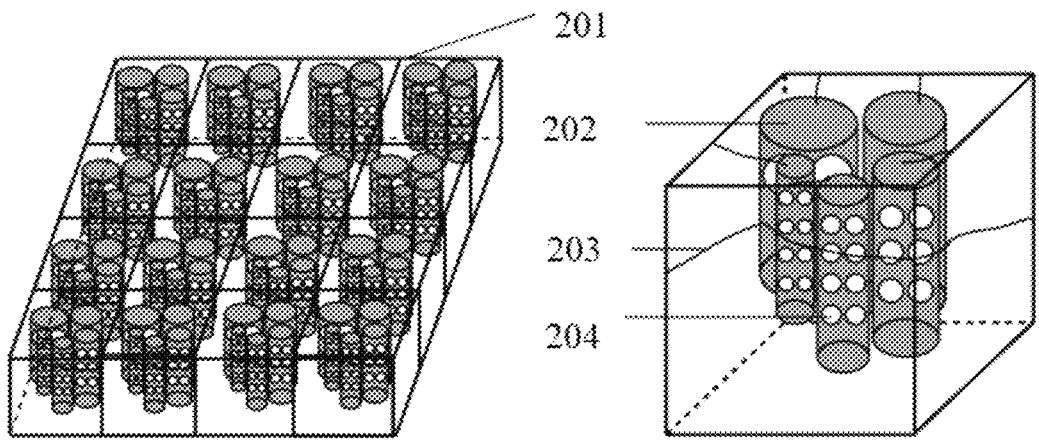
FIG. 2 is a schematic diagram of a pipe reef.
Figure 3:
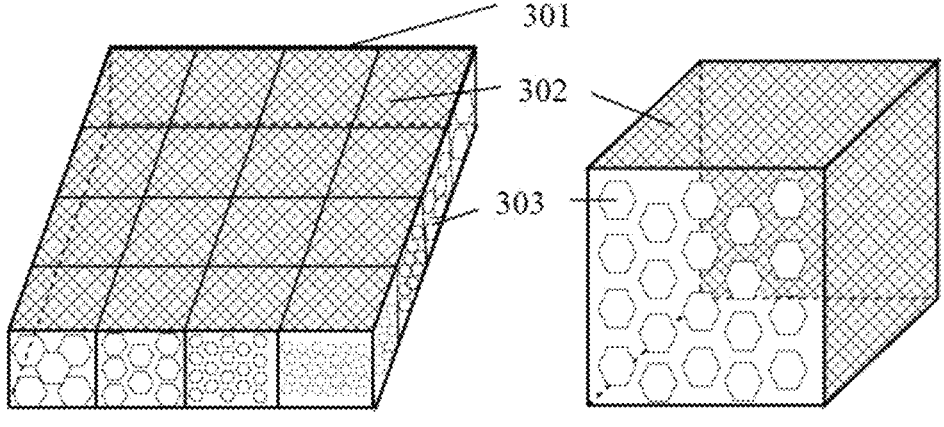
FIG. 3 is a schematic diagram of a gabion mesh box.
Figure 4:
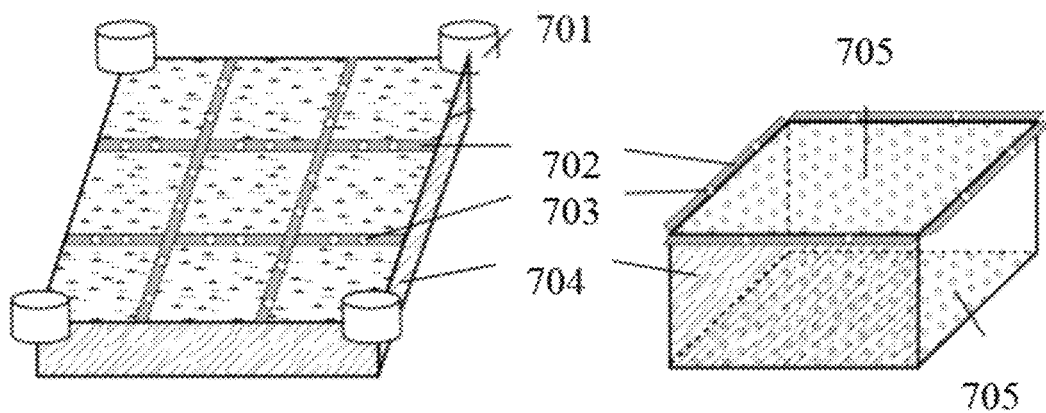
FIG. 4 is a schematic diagram of a plant floating bed.

As shown in FIGS. 1-5, the present application provides the following technical solutions: an estuarine fisheries habitat restoration three-dimensional device includes a plant floating bed region 1, a pipe reef region 2, a gabion mesh box region 3 and a stainless steel frame structure 5;

the plant floating bed region 1 includes: a foam float 701, an angle iron 702, a screw hole 703 in the angle iron 702 for fixing a floating bed, a plant root system 704, and a polyethylene mesh 705;

the pipe reef region 2 comprises: a stainless steel frame 201, a PVC pipe 202, a first nylon rope 203, a hole 204 opened in the polyvinyl chloride (PVC) pipe;

the gabion mesh box region 3 comprises: a stainless steel frame 301, a lead wire cage 302, a stone block 303;

the plant floating bed region 1 is located in an upper part of the stainless steel frame, and is composed of the foam float 701, the stainless steel tube frame and a floating bed plant module, the upper part of the stainless steel frame 301 is welded into nine squares through the angle iron 702, and the floating bed plant module is placed in each square, the floating bed plant module is screwed to the stainless steel frame through the screw hole 703 in the angle iron 702;

the floating bed plant module is composed of two layers of polyethylene mesh 705es on a top and a bottom and the plant root system 704 filled in a middle, and is fastened through a plastic ties;

an entire floating bed frame is nested in the stainless steel frame and is located in an uppermost part of the stainless steel frame, and is connected to the stainless steel frame through the nylon rope 203;

the foam float 701 makes the floating bed with the tidal up and down and does not break away from the stainless steel frame 201, plant growth purifies the water, a surface of the floating bed provides a resting place for birds, and the plant root system 704 provides an attachment substrate for fish eggs and young fish;

a filling ratio of the plant root system 704 in the floating bed plant module is determined by a formula:

$$P = \frac{V_r}{V_m} \times 100\%$$

where P is the filling ratio of the plant root system 704, $V_r$ is a total volume of the plant root system 704, and $V_m$ is a total volume of the floating bed plant module, and the total volume of the plant root system 704 is determined by a product of multiplying an average volume of a single plant root system 704 with an average volume of the plant root system 704 in the floating bed plant module, and the total volume of the floating bed plant module is calculated based on a size of the floating bed plant module;

the pipe reef region 2 is located in a middle of the stainless steel frame and above the gabion mesh box region 3, 5 different pipe diameter specifications of the PVC pipes 202 are placed on the upper part of the stainless steel frame in the 16 squares, and fixed to the stainless steel frame through the nylon rope 203;

the pipe reef region 2 provides hiding and sheltering places for fish aquatic organisms, attached organisms is attached in a wall of the PVC pipe 202, and a distribution density of holes on the PVC pipe 202 is calculated based on a formula:

$$D = \frac{n}{\pi r L};$$

where D is the distribution density of hole, n is a number of holes on a single PVC pipe 202, r is a radius of the PVC pipe 202, L is a length of the PVC pipe 202, and the number of holes on the single PVC pipe 202 is set according to ecological function requirements of the PVC pipe 202s with different pipe diameter specifications;

wherein the gabion mesh box region 3 is provided at a very bottom of the stainless steel frame, with a lead wire cage to make an independent gabion mesh, each gabion mesh is filled with different specifications of stone blocks, each specification is filled with 4 gabion meshes, 16 gabion meshes are randomly placed into a lower part of the stainless steel frame of 16 small squares, a removable cross-bar is provided around the stainless steel frame, the gabion mesh box provides shrimp and crabs and various types of benthic organisms for suitable habitat, different specifications of the stone blocks are filled and layout in the gabion mesh box using layered random filling algorithm, the specific steps are as follows: first, dividing the gabion mesh box into a number of equal volume of small cells, for each specification of the stone block, randomly selecting the small cells for filling, a filling ratio of different specifications of the stone blocks in the gabion mesh box is calculated according to a formula:

$$R_i = \frac{N_i}{N_t} \times 100\%,$$

where $R_i$ is a filling ratio of ith specification stone blocks, $N_i$ is a number of the ith specification stone blocks, $N_t$ is a total number of stone blocks in the gabion mesh box, the number of stone blocks is determined according to a volume of the gabion mesh box, specifications of the stone blocks, and a demand for biological habitat;

the stainless steel frame structure 5 is formed by welding stainless steel as a fixed device, a bottom of the stainless steel frame structure 5 is welded with a steel plate as a base, to prevent falling into the sediment deposit, steel pipes are welded in at horizontal and vertical intervals in height of 0.25 m and 0.75 m to form 16 small squares, a surrounding of the entire stainless steel frame structure 5 is connected to an anchor 4 through the nylon rope 203, the device is fixed in an estuarine intertidal waters, a welding process of the stainless steel frame structure 5 uses a staggered welding method, firstly, a horizontal steel pipe and a vertical steel pipe are spot-welded and fixed at each intersection, then starting from one corner of the stainless steel frame structure 5 to be welded successively based on a specific order, and every time a section of the stainless steel frame structure 5 is welded, an intersection is skipped, and then welding is continued, and a determination of a welding order is derived from an analysis of the force of the the stainless steel frame structure 5 under the impact of the water current and the action of wind and waves.

In one embodiment, a selection of the plant root system 704 in the floating bed plant module is based on water quality conditions and biological attachment needs of the estuarine intertidal region, includes:

performing an ecological function analysis of common aquatic plant root systems 704 in an estuarine intertidal region, comprising an ability to absorb nitrogen and phosphorus nutrients in a water body and a stability of providing attachment for fish egglets;

establishing an ecological function evaluation model for the plant root system 704, and evaluation indexes comprise a surface area of the plant root system 704, a density of root hairs, and a composition of secretion, and analyzing a field sampling and a laboratory analysis of a variety of plant root systems 704;

obtaining data of each evaluation index, determining a weight of each evaluation index by using hierarchical analysis, calculating a comprehensive ecological function value of each plant root system 704 based on an evaluation model, and selecting a combination of plant root systems 704 with a higher comprehensive ecological function value to be used in the floating bed plant module, wherein a combination mode is matched based on characteristics of different plant root systems 704.

In one embodiment, the method of selecting material and determining the diameter specification of the PVC pipe 202 is:

performing corrosion resistance, strength and biocompatibility tests on pipes of different materials, placing samples of pipes of different materials in a simulated environment of an estuarine intertidal region;

regularly detecting changes in physical properties of the pipes, and observing attachment and growth of organisms on surfaces of the pipes, and after a long period of time for testing and comparing, discovering that the PVC material is relatively well-balanced in terms of corrosion resistance, strength and biocompatibility, and is suitable for use as the material for the pipe reef;

for a determination of diameter specifications of the pipes, through a study of a body size distribution of fishes and other aquatic organisms in the estuary, a cluster analysis method is used to divide body sizes of the organisms into different categories, and the number of PVC pipes 202 with different diameter specifications is determined based on a proportion of the number of organisms in each category and the demand for space for activities of the organisms in each category.

In one embodiment, a weaving structure and a mesh size of the lead wire cage in the gabion mesh box are designed as follows:

the lead wire cage adopts a double-twisted hexagonal braided structure, which has a higher stability and strength, and during a braiding process, a stranding angle of a lead wire is accurately calculated, and the stranding angle α is determined according to a formula:

$$\alpha = \arctan\left(\frac{d}{h}\right),$$

wherein d is a diameter of the lead wire, and h is a vertical distance between neighboring lead wires, and the stranding angle is optimized by adjusting the diameter of the lead wire and the vertical distance, and the mesh size is designed based on a body size of target benthic organisms, and a dynamic adaptive mesh size algorithm is adopted;

the body size data of common benthic organisms in the estuary are statistically analyzed to obtain a distribution range of the organisms, and based on a distribution of the body sizes of the organisms, the mesh sizes are divided into several grades, and each grade corresponds to a certain range of the organisms;

starting to install the device, a larger mesh size is used and is gradually adjusted according to the development of the biological community, to make the mesh size always be adapted to the growth and habitat needs of the organisms.

In one embodiment, the stainless steel frame structure 5 is connected to the anchor 4 in a following manner:

adopting adjustable length nylon rope 203 to connect the stainless steel frame structure 5 and the anchor 4, one end of the nylon rope 203 is fixed at a specific position of the stainless steel frame structure 5 by a special buckle structure, the buckle structure ensures that the nylon rope 203 doesn't fall off when subjected to tensile force and is easy to be installed and dismantled, another end of the nylon rope 203 is connected to the anchor 4, and a shape and a weight of the anchor 4 is designed according to substrate conditions of the estuarine intertidal region; and for a silty substrate, a flat anchor 4 is used, which has a larger area and provides a larger ground force;

for a sandy substrate, a claw anchor 4 is used, whose claw penetrates deep into a sand layer and enhance a fixing effect of the anchor 4, and a length of the nylon rope 203 is adjustable to in a range of 3 m to 5 m;

an adjustable mechanism is based on a tidal water level and an impact force of the water flow are monitored in real time; and after the device is installed, the tidal water level and water current impact force are monitored by a sensor mounted on the frame, and a length of the nylon rope 203 is automatically adjusted according to the monitoring data, to make the device remain stable under different water level and water current conditions.

In one embodiment, a method of adjusting a buoyancy of the foam float 701 of the plant floating bed is that the foam float 701 is internally divided into a plurality of independent gas chambers using a partitioned structure, and each gas chamber is equipped with a valve that can adjust the air pressure, through which the valve controls the inflow and outflow of gas within the gas chamber, thereby adjusting the buoyancy of the foam float 701, and the buoyancy is adjusted based on a calculation of the balance between an overall weight of the device and a buoyancy of the tidal water, and measuring a total weight $W_t$ of the plant floating bed, the pipe reef, the gabion mesh box, and the attached living organisms;

a required buoyancy $F_b = \rho\, gV_i$ is calculated based on a density ρ of the tidal water and a submerged volume $V_i$ of the device in the tidal water, wherein g is an acceleration of gravity, and by adjusting an air pressure inside the air chamber of the foam float 701, the buoyancy provided by the foam float 701 is equal to or slightly greater than the required buoyancy, to ensure that the plant floating bed is able to float up and down smoothly with the tidal water, and is not detached from the frame due to an excessive buoyancy in the extreme weather conditions.

In one embodiment, a fixed angle and a height of the PVC pipe 202 in the pipe reef on the frame are set that:

the fixed angle of the PVC pipe 202 on the frame is optimized based on a direction of the water flow in the estuary and light conditions, and through long-term monitoring of the direction of the water flow in the estuary, to obtain a main flow direction and a change rule of a speed of the water flow, the PVC pipe 202 is fixed to the frame, so that it is at an angle θ to the direction of the water flow, and a range of θ is 30°-60°, and such angle is set to enable the water flow to produce turbulence when passing through the PVC pipe 202, increasing an oxygen content in the water, and it is easy for the organisms to enter and exit a pipe silo; and for a light condition, according to a change of sunshine time and an altitude angle of the sun in the estuary region, adjusting the height of the PVC pipe 202, to make the PVC pipe 202 obtain suitable light in different seasons and time, to promote the growth of the organisms attached on walls of the pipes, and a height adjustment is realized by setting a movable fixing device on the frame, the height of the PVC pipe 202 is precisely adjusted according to the actual demand.

In one embodiment, a surface treatment method of the stone blocks in the gabion mesh box is that a surface of the stone block is treated with a biophilic coating, the coating material is made of a mixture of natural biological material and organic binder, the natural biological material comprises shell powder and coral powder, which are rich in calcium and magnesium;

a preparation process of coating comprises mixing the natural biological material and the organic binder evenly according to a certain ratio, and the coating is uniformly covered on the stone block using a spraying or soaking method surface, a thickness of the coating is determined by a formula:

$$T = \frac{m}{\rho_c S},$$

where T is the thickness of the coating, m is a mass of the coating per unit area, $\rho_c$ is a density of the coating material, and S is a surface area of the stone block.

In another embodiment, there is provided an estuarine fisheries habitat restoration three-dimensional device, including:

S1, sampling time determination: a first assessment is started one month after an installation of a restoration device is completed, and a subsequent assessment interval is determined based on a seasonal change rule of an estuarine ecosystem and a biological growth cycle, respectively, and the sampling is arranged in a spring, summer, fall, and winter, so that the sampling time arrangement comprehensively reflects an effect of the restoration device on impacts of various types of aquatic organisms in the estuary in different seasons;

S2, sampling region division: a region where the restoration device is located is divided into a number of sub-regions, each of which comprises a part of a plant floating bed region 1, a pipe reef region 2 and a gabion mesh box region 3, while a control sub-region is divided in a nearby mudflat in accordance with same regions and shapes, and the division of the sub-regions is made by using geographic information system (GIS) technology, which is accurately divided based on topography and geomorphological features of the device and the mudflat, to ensure that each sub-region is representative and that the sub-regions in the restoration region and control regions are comparable in terms of environmental conditions;

S3, sampling method:

sampling of gabion mesh boxes: from the gabion mesh boxes in each sub-region, a certain proportion of mesh boxes is selected for sampling according to a random stratified sampling method, for the mesh boxes with different sizes of stone blocks, the samples are collected in, respectively, an upper, middle, and lower layers, and benthic fauna, and barnacles, oysters and all aquatic organisms attached to the stone blocks are collected into sample bottles, and a sampling tool is used in a sampling process, which is capable of deep into different locations inside the mesh boxes to avoid damage to the organisms and to ensure the comprehensiveness of the samples collected;

sampling of a pipe reef: in each sub-region of the pipe reef, a number of groups of PVC pipes 202 are randomly selected for sampling, for each group of PVC pipes 202, biological samples are collected from an inlet, a middle, and an outlet, and organisms from all PVC pipes 202 are collected into sample bottles, and a gentle flushing method is used to flush the organisms out of the pipes while avoiding flushing away small organisms or damaging biological tissue;

sampling of a plant floating bed: in each sub-region of the plant floating bed, first measuring height, density, and growth indicators of plants on a ground, using non-destructive measurement methods, and then selecting a certain number of plant floating bed modules for destructive sampling according to an equidistant sampling method from plant floating bed modules, a whole collection is installed into a sorting box, and adopting a stratified sampling method to collect from a surface, middle and deep layers of sediment samples of 50 cm*50 cm*50 cm collected in the control sub-region during a control sampling in a surface, middle and deep layers of sediment are collected respectively, and collecting aquatic organisms samples after flushing through a screen of 0.5 mm;

S4, sample processing and analysis: bringing all collected samples back to a laboratory, separating a part of plant floating bed samples on the ground and a root part of plant floating bed samples, and measuring dry and wet weights using a high-precision balance, while analyzing chemical composition of plant tissues for detecting nutrient content and heavy metal content indexes, classifying and screening other aquatic organisms samples to remove impurities, and using a combination of morphological identification and molecular biology identification for species identification, and using precision measuring instruments to measure sizes, weights and biological parameters of the identified organisms;

S5, data processing and evaluation index calculation: establishing a specialized database, entering and managing the data collected and analyzed, and calculating various evaluation indexes, including a biological species richness S, a biological number N, a biological density $D_b$, a shannon-weiner index H, wherein the biological species richness is derived from the number of species identified through statistics, the biological number is a sum of a number of individuals of each species, and the biological density is derived from an area of a sampling region and a number of organisms, and the shannon-weiner index is $$H = -\sum_{i=1}^{S} p_i \ln p_i,$$

$P_i$ is a ratio of a number of individuals of an ith species to a total number of individuals, and a restoration effect of the restoration device on estuarine fisheries habitats is evaluated by comparing differences between the restoration region and the control region in terms of these indicators.

Embodiment 1

This embodiment describes a small estuarine region where fisheries resources are gradually decreasing due to water pollution and habitat destruction, the estuarine inter-tidal region has a slow water current, the substrate is mainly silty, and the surrounding region is subject to a certain influence of human activities, such as small-scale industrial discharges and agricultural face source pollution.

According to the water quality and biological needs of the estuary, reed and calamus plant root systems are selected to form the floating bed plant module, the average volume of a single plant root system and the number of plant root systems in the module are measured to calculate the total volume of plant root systems, and then the total volume is derived according to dimensions of the module, and a filling ratio of the plant root system is determined to be 60% according to the formula, which is $$P = \frac{V_r}{V_m} \times 100\%,$$

where P is a filling ratio of the plant root system, $V_r$ is a total volume of the plant root system, and $V_m$ is the total volume of the floating bed plant module. The foam float adopts a separated structure, and the air pressure inside the air chamber is adjusted to make the buoyancy and the weight of the device balanced, so as to ensure that the floating bed floats smoothly with the tide.

After material testing, the PVC pipe is selected as the pipe reef material, and after the distribution study of fish body in the estuary, it is determined that three kinds of PVC pipes with diameters of 10 cm, 15 cm, and 20 cm are used, with the quantities of 6, 5, and 4 respectively, and the PVC pipe is fixed on the frame at an angle of 45° with the direction of the water flow at the height of 0.5 m, so as to produce turbulence to increase the oxygen, and also to facilitate the biology. The number of holes on a single PVC pipe is set according to the pipe diameter specification and ecological function demand, and the distribution density of holes is calculated and reasonably distributed.

The gabion mesh box adopts lead wire cage with double twisted hexagonal weaving structure, the diameter of lead wire is 3 mm, the vertical distance between adjacent lead wires is 5 mm, the stranding angle is determined as α=arctan (⅗) by the formula, the mesh size is set as 5 cm×5 cm at the beginning, and it is adjusted according to the development of the biotopes, and each mesh box is filled with three kinds of specifications of stone blocks, such as 5 cm-10 cm, 10 cm-15 cm, 15 cm-20 cm, each specification is filled with 4 mesh boxes, there is a total of 16 mesh boxes, after calculating the filling ratio of different specifications of stone blocks, the formula is $$R_i = \frac{N_i}{N_t} \times 100\%,$$

which $R_i$ is a filling ratio of the ith specification of stone blocks, $N_i$ is the number of the ith specification of stone blocks, $N_t$ is the total number of stone blocks in the gabion mesh box, the layered random filling algorithm is put into the lower part of the square grid in the frame.

A bottom of the stainless steel frame is welded with a steel plate, at a height of 0.25 m and 0.75 m and at the horizontal and vertical intervals of 50 cm, the steel pipe is welded to form 16 small squares, the impact resistance is improved by using staggered welding method, a periphery of the frame is connected to the flat plate anchor by the nylon rope, the length of the nylon rope, according to the change of the tidal water level and the impact of the water flow of the real-time monitoring, can be adjusted within the range of 3 m-5 m.

One month after the installation of the restoration device is completed, the first assessment is conducted in the spring when the water temperature rebounded, and the subsequent sampling is conducted according to the specific period of the season, in the summer when the biological growth is vigorous, in the fall after the biological reproduction period, and in the winter before the organisms enter into the dormant period.

The region where the restoration device is located is divided into four sub-regions using geographic information system (GIS) technology, each containing a portion of the plant floating bed region, the pipe reef region, and the gabion mesh box region, while control sub-regions of the same size and shape are divided in the nearby mudflat.

From the gabion mesh box of each sub-region, 30% of the mesh boxes are randomly stratified, samples are collected from the upper, middle and lower layers of different sizes of gabion mesh boxes, and benthic fauna and attached organisms are collected with specialized sampling tools.

Three groups of PVC pipes are randomly selected from pipe reefs of each sub-region, and biological samples are collected from the inlet, middle, and outlet, and organisms in the pipes are gently rinsed.

The height, density, and growth index of above-ground plants in the plant floating bed are measured, 10 floating bed plant modules at equal distance for destructive sampling are taken, and collected into a sorting box; sediment samples of 50 cm*50 cm*50 cm are collected from the control region, and aquatic organism samples are collected by flushing through a screen of 0.5 mm after stratified sampling.

The samples are brought back to the laboratory, the above ground part and root part of the plant floating bed samples are separated from to measure the dry weight, wet weight and analyze the chemical composition, other aquatic organisms samples are classified and screened, to remove impurities, morphology and molecular biology are used to identify the species, and the size and weight of individuals are measured with precision instruments for biological parameters.

A database is set up and data are entered to calculate the biological species richness, number, density and Shannon-Weiner Index $$(SWI)\, H = -\sum_{i=1}^{S} p_i \ln p_i,$$

$P_i$ is a ratio of the number of individuals of the ith species to the total number of individuals, and the difference between the restored region and the control region is used to assess the restoration effect.

Embodiment 2

This embodiment describes an estuary region where, due to the construction of various types of water conservancy projects such as beach reclamation, there is a serious loss of intertidal aquatic habitat, a significant reduction in the number of fish and benthic organisms, and an imbalance in the aquatic ecosystem.

Reeds with developed root systems are selected to fill the floating bed plant modules, which are placed in the upper square of the stainless steel frame, fixed by angle iron, screws and nylon ropes, and surrounded by foam floats to regulate the buoyancy and ensure smooth floating with the tide.

After the material test, the PVC pipe is selected, according to the distribution of fish size in the estuary (mostly small and medium-sized fish), the main small and medium-sized pipe diameter of pipes are determined, the PVC pipe is fixed in the framework of the upper frame according to a specific angle (at an angle 45° to the direction of the water) and height (adjusted according to the sunshine), the distribution density of holes is calculated in accordance with ecological function needs by a formula $$D = \frac{n}{\pi r L},$$

D is the distribution density of holes, n is the number of holes on a single PVC pipe, r is the radius of the PVC pipe, L is the length of the PVC pipe, and it provides a good environment for fish and attached organisms.

A lead wire cage adopts double-twisted hexagonal braided structure, the mesh size is initially larger, and subsequently adjusted according to the growth of benthic organisms, the stone blocks are treated with biophilic coating, and then filled with different specifications of stone blocks according to the layered random filling algorithm, the formula is $$R_i = \frac{N_i}{N_t} \times 100\%,$$

$R_i$ is a filling ratio of the ith specification of stone blocks, $N_i$ is the number of the ith specification of stone blocks, and $N_t$ is the total number of stone blocks in the gabion mesh box, and the mesh box is placed in square at the bottom of the frame, which provides a good environment for shrimps, crabs and benthic organisms.

The stainless steel frame adopts staggered welding process, steel tubes are welded in horizontal and vertical intervals to form a square grid, a steel plate base is welded at the bottom of the stainless steel frame, a surrounding of the stainless steel frame is connected with flat anchors suitable for the substrate (silt) by adjustable nylon ropes, the length of the nylon ropes is adjusted according to the monitoring data of the tidal water level and current impact, and the device is fixed in the estuarine intertidal region.

One month after the installation of the device, the sampling time is determined according to the seasonal characteristics, and the restoration device and the nearby mudflat are divided into sub-regions using a geographic information system (GIS) to ensure that the restoration region and the control region are comparable.

Samples of plant floating beds, pipe reefs, gabion mesh boxes and control regions are collected according to their respective sampling methods and brought back to the laboratory for processing and analysis, including plant weight and composition analysis, biological classification, identification and parameter measurement.

After data processing and evaluation index calculation, the richness, number, density and diversity index of biological species in the restoration region are significantly higher than those in the control region, and the number of fish and benthic organisms is gradually increased, indicating that the device is able to provide suitable habitat for various types of swimming and benthic animals in the estuary, and that the restoration effect of the estuarine fisheries habitats is significant.

The above is only a better embodiment of the present application, and is not a formal limitation of the present application, although the present application has been revealed as a better embodiment, but is not used to limit the present application, those skilled in the art, without departing from the scope of the technical solution of the present application, can use the technical content of the above disclosure to make some changes or modifications, but without departing from the scope of the technical solution of the present application, any modification, change or amendment to the above embodiments based on the technical substance of the present application still belongs to the technical program of the present application.

What is claimed is:

1. An estuarine fisheries habitat restoration three-dimensional device, comprising a plant floating bed region, a pipe reef region, a gabion mesh box region and a stainless steel frame structure;

wherein the plant floating bed region comprises: a foam float, an angle iron, a screw hole in the angle iron for fixing a floating bed, a plant root system, and a polyethylene mesh;

wherein the pipe reef region comprises: a stainless steel frame, a PVC pipe, a first nylon rope, a hole opened in the polyvinyl chloride (PVC) pipe;

wherein the gabion mesh box region comprises: a stainless steel frame, a lead wire cage, a stone block;

wherein the plant floating bed region is located in an upper part of the stainless steel frame, and is composed of the foam float, the stainless steel tube frame and a floating bed plant module, the upper part of the stainless steel frame is welded into nine squares through the angle iron, and the floating bed plant module is placed in each square, the floating bed plant module is screwed to the stainless steel frame through the screw hole in the angle iron;

the floating bed plant module is composed of two layers of polyethylene meshes on a top and a bottom and the plant root system filled in a middle, and is fastened through a plastic ties;

an entire floating bed frame is nested in the stainless steel frame and is located in an uppermost part of the stainless steel frame, and is connected to the stainless steel frame through the nylon rope;

the foam float makes the floating bed with the tidal up and down, plant growth is configured to purify the water, a surface of the floating bed is configured to provide a resting place for birds, and the plant root system is configured to provide an attachment substrate for fish eggs and young fish;

a filling ratio of the plant root system in the floating bed plant module is determined by a formula:

$$P = \frac{V_r}{V_m} \times 100\%$$

where P is the filling ratio of the plant root system, $V_r$ is a total volume of the plant root system, and $V_m$ is a total volume of the floating bed plant module, and the total volume of the plant root system is determined by a product of multiplying an average volume of a single plant root system with an average volume of the plant root system in the floating bed plant module, and the total volume of the floating bed plant module is calculated based on a size of the floating bed plant module;

wherein the pipe reef region is located in a middle of the stainless steel frame and above the gabion mesh box region, 5 different pipe diameter specifications of the PVC pipes are placed on the upper part of the stainless steel frame in the 16 squares, and fixed to the stainless steel frame through the nylon rope;

the pipe reef region is configured to provide hiding and sheltering places for fish aquatic organisms, and a distribution density of holes on the PVC pipe is calculated based on a formula:

$$D = \frac{n}{\pi r L},$$

where D is the distribution density of hole, n is a number of holes on a single PVC pipe, r is a radius of the PVC pipe, L is a length of the PVC pipe, and the number of holes on the single PVC pipe is set according to ecological function requirements of the PVC pipes with different pipe diameter specifications;

wherein the gabion mesh box region is provided at a very bottom of the stainless steel frame, with a lead wire cage to make an independent gabion mesh, wherein a weaving structure and a mesh size of the lead wire cage in the gabion mesh box are designed as follows:

the lead wire cage adopts a double-twisted hexagonal braided structure, which has a higher stability and strength, and a stranding angle $\alpha$ of a lead wire is determined according to a formula:

$$\alpha = \arctan\left(\frac{d}{h}\right),$$

wherein d is a diameter of the lead wire, and h is a vertical distance between neighboring lead wires, and the stranding angle is optimized by adjusting the diameter of the lead wire and the vertical distance, and the mesh size is designed based on a body size of target benthic organisms, and a dynamic adaptive mesh size algorithm is adopted;

the body size data of common benthic organisms in the estuary are statistically analyzed to obtain a distribution range of the organisms, and based on a distribution of the body sizes of the organisms, the mesh sizes are divided into several grades, and each grade corresponds to a certain range of the organisms;

each gabion mesh is filled with different specifications of stone blocks, 16 gabion meshes are randomly placed into a lower part of the stainless steel frame of 16 small squares, a removable cross-bar is provided around the stainless steel frame, the gabion mesh box is configured to provide shrimp and crabs and various types of benthic organisms for suitable habitat, different specifications of the stone blocks are filled and layout in the gabion mesh box using layered random filling algorithm, the specific steps are as follows: first, dividing the gabion mesh box into a number of equal volume of small cells, for each specification of the stone block, randomly selecting the small cells for filling, a filling ratio of different specifications of the stone blocks in the gabion mesh box is calculated according to a formula:

$$R_i = \frac{N_i}{N_t} \times 100\%,$$

where $R_i$ is a filling ratio of ith specification stone blocks, $N_i$ is a number of the ith specification stone blocks, $N_t$ is a total number of stone blocks in the gabion mesh box, the number of stone blocks is determined according to a volume of the gabion mesh box, specifications of the stone blocks, and a demand for biological habitat;

wherein a surface of the stone block comprises a biophilic coating, the coating material is made of a mixture of natural biological material and organic binder, the natural biological material comprises shell powder and coral powder, which are rich in calcium and magnesium;

wherein a preparation process of coating comprises mixing the natural biological material and the organic binder evenly according to a certain ratio, and the coating is uniformly covered on the stone block using a spraying or soaking method surface, a thickness of the coating is determined by a formula:

$$T = \frac{m}{\rho_c S},$$

where T is the thickness of the coating, m is a mass of the coating per unit area, $\rho_c$ is a density of the coating material, and S is a surface area of the stone block;

wherein the stainless steel frame structure is formed by welding stainless steel as a fixed device, a bottom of the stainless steel frame structure is welded with a steel plate as a base, to prevent falling into the sediment deposit, steel pipes are welded in at horizontal and vertical intervals in height of 0.25 m and 0.75 m to form 16 small squares, a surrounding of the entire stainless steel frame structure is connected to an anchor through the nylon rope, the device is fixed in an estuarine intertidal waters, a welding process of the stainless steel frame structure uses a staggered welding method, firstly, a horizontal steel pipe and a vertical steel pipe are spot-welded and fixed at each intersection, then starting from one corner of the stainless steel frame structure to be welded successively based on a specific order, and every time a section of the stainless steel frame structure is welded, an intersection is skipped, and then welding is continued, and a determination of a welding order is derived from an analysis of the force of the stainless steel frame structure under the impact of the water current and the action of wind and waves.

2. An estuarine fisheries habitat restoration three-dimensional method, comprising:

providing the device of claim 1 into a body of water;

S1, determining a sampling time: making a first assessment one month after an installation of the restoration three-dimensional device is completed, and determining a subsequent assessment interval based on a seasonal change rule of an estuarine ecosystem and a biological growth cycle, respectively, wherein the sampling is arranged in a spring, summer, fall, and winter, so that the sampling time arrangement comprehensively reflects an effect of the restoration device on impacts of various types of aquatic organisms in the estuary in different seasons;

S2, dividing a sampling region: dividing a region where the restoration three-dimensional device is located into a number of sub-regions, each of which comprising a part of the plant floating bed region, the pipe reef region and the gabion mesh box region, dividing a control sub-region in a nearby mudflat in accordance with same regions and shapes, and making the division of the sub-regions by using geographic information system (GIS) technology, which is accurately divided based on topography and geomorphological features of the device and the mudflat, to ensure that each sub-region is representative and that the sub-regions in the restoration region and control regions are comparable in terms of environmental conditions;

S3, sampling gabion mesh boxes: from the gabion mesh boxes in each sub-region, selecting a certain proportion of mesh boxes for sampling according to a random stratified sampling method, for the mesh boxes with different sizes of stone blocks, collecting the samples in, respectively, an upper, middle, and lower layers, and benthic fauna, and barnacles, collecting oysters and all aquatic organisms attached to the stone blocks into sample bottles, and wherein a sampling tool is used in a sampling process, which is capable of deep into different locations inside the mesh boxes to avoid damage to the organisms and to ensure the comprehensiveness of the samples collected;

sampling a pipe reef: randomly selecting in each subregion of the pipe reef, a number of groups of PVC pipes for sampling, for each group of PVC pipes, collecting biological samples from an inlet, a middle, and an outlet, and collecting organisms from all PVC pipes into sample bottles, and using a gentle flushing method to flush the organisms out of the pipes while avoiding flushing away small organisms or damaging biological tissue;

sampling a plant floating bed: in each sub-region of the plant floating bed, first measuring height, density, and growth indicators of plants on a ground, using nondestructive measurement methods, and then selecting a certain number of plant floating bed modules for destructive sampling according to an equidistant sampling method from plant floating bed modules, a whole collection is installed into a sorting box, and adopting a stratified sampling method to collect from a surface, middle and deep layers of sediment samples of 50 cm×50 cm×50 cm collected in the control sub-region during a control sampling in a surface, middle and deep layers of sediment are collected respectively, and collecting aquatic organisms samples after flushing through a screen of 0.5 mm;

S4, processing and analyzing sample: bringing all collected samples back to a laboratory, separating a part of plant floating bed samples on the ground and a root part of plant floating bed samples, and measuring dry and wet weights using a high-precision balance, while analyzing chemical composition of plant tissues for detecting nutrient content and heavy metal content indexes, classifying and screening other aquatic organisms samples to remove impurities, and using a combination of morphological identification and molecular biology identification for species identification, and using precision measuring instruments to measure sizes, weights and biological parameters of the identified organisms;

S5, establishing a specialized database, entering and managing the data collected and analyzed, and calculating various evaluation indexes, including a biological species richness S, a biological number N, a biological density Db, a shannon-weiner index H, wherein the biological species richness is derived from the number of species identified through statistics, the biological number is a sum of a number of individuals of each species, and the biological density is derived from an area of a sampling region and a number of organisms, and the shannon-weiner index is $$H = -\sum\nolimits_{i=1}^{S} p_i \ln p_i,$$

Pi is a ratio of a number of individuals of an ith species to a total number of individuals, and a restoration effect of the restoration device on estuarine fisheries habitats is evaluated by comparing differences between the restoration region and the control region in terms of these indicators.

* * * * *